United States Patent
Liu et al.

(10) Patent No.: US 10,651,669 B2
(45) Date of Patent: May 12, 2020

(54) PHASE SHIFT CONTROL METHOD FOR CHARGING CIRCUIT

(71) Applicant: Shenzhen VMAX New Energy Co., Ltd., Shenzhen, Guangdong (CN)

(72) Inventors: Jun Liu, Guangdong (CN); Yingying Feng, Guangdong (CN); Shun Yao, Guangdong (CN); Jinzhu Xu, Guangdong (CN)

(73) Assignee: SHENZHEN VMAX NEW ENERGY CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/521,720

(22) Filed: Jul. 25, 2019

(65) Prior Publication Data
US 2020/0052498 A1    Feb. 13, 2020

(30) Foreign Application Priority Data
Aug. 10, 2018 (CN) .......................... 2018 1 0910880

(51) Int. Cl.
*H02M 3/335* (2006.01)
*H02J 7/00* (2006.01)
*H02M 1/088* (2006.01)

(52) U.S. Cl.
CPC ............... *H02J 7/007* (2013.01); *H02J 7/00* (2013.01); *H02M 1/088* (2013.01); *H02M 3/33576* (2013.01)

(58) Field of Classification Search
CPC ........... H02J 7/007; H02J 7/00; H02M 1/088; H02M 3/33576; Y02B 70/1433
(Continued)

(56) References Cited

U.S. PATENT DOCUMENTS

| 1,021,747 | A | * | 3/1912 | Bull | ...................... G10F 5/06 84/140 |
| 7,184,280 | B2 | * | 2/2007 | Sun | ................... H02M 3/33592 363/127 |

(Continued)

FOREIGN PATENT DOCUMENTS

| CN | 104184329 A | 12/2014 |
| CN | 108237943 A | 7/2018 |

OTHER PUBLICATIONS

State Intellectual Property Office of the P. R. C, "Office Action", dated Jun. 18, 2019, China.

*Primary Examiner* — Rajnikant B Patel
(74) *Attorney, Agent, or Firm* — Locke Lord LLP; Tim Tingkang Xia, Esq.

(57) ABSTRACT

A phase shift control method for a charging circuit is disclosed. The charging circuit includes a primary conversion circuit, a first secondary conversion circuit, and a second secondary conversion circuit. The controller causes a phase angle difference Φ between an ON/OFF waveform of power switches in the primary conversion circuit and an ON/OFF waveform of power switches in the first secondary conversion circuit. The controller collects an output current (Io1) and an output voltage (Vo1) of the first secondary conversion circuit, collected by the first secondary current collector and the first secondary voltage collector, carries out comparison and calculation between the collected output current and output voltage and a preset output current and output voltage, and adjusts the magnitude and positive and negative of the phase angle difference Φ according to the comparison result.

8 Claims, 8 Drawing Sheets

(58) Field of Classification Search
USPC ............. 363/16–17, 21.02, 21.03, 21.06, 41, 363/97–98, 132, 159, 163; 323/235–237
See application file for complete search history.

(56) References Cited

U.S. PATENT DOCUMENTS

| | | | |
|---|---|---|---|
| 7,400,061 B2* | 7/2008 | Steigerwald | H02M 3/33561 307/17 |
| 8,811,039 B2* | 8/2014 | The Ngo | H02M 3/33584 363/21.02 |
| 9,954,453 B1* | 4/2018 | Ishino | H02M 3/33507 |
| 2010/0182803 A1 | 7/2010 | Nan et al. | |

* cited by examiner

PHASE SHIFT CONTROL METHOD FOR CHARGING CIRCUIT

CROSS-REFERENCE TO RELATED PATENT APPLICATION

This non-provisional application claims priority to and the benefit of, pursuant to 35 U.S.C. § 119(a), patent application Serial No. CN201810910880.4 filed in China on Aug. 10, 2018. The disclosure of the above application is incorporated herein in its entirety by reference.

FIELD

The present invention relates to the technical field of electric vehicle charging, and in particular, to a phase shift control method for a three-port charging circuit.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

With the increasing requirements for energy saving and emission reduction, as well as air pollution control, new energy vehicles are gradually being promoted and applied in the market, and electric vehicles are the main force of new energy vehicles. A vehicle-mounted charger is an important part of an electric vehicle. The vehicle-mounted charger generally has an AC input terminal and two DC output terminals. The AC input terminal is connected to the mains network; the first DC output terminal charges a high-voltage battery and thus is equivalent to a main circuit output; the second DC output terminal supplies power to in-vehicle electrical devices and a low-voltage small battery and thus is equivalent to an auxiliary circuit output. In the traditional transformer integrated multi-port power output, the problem of automatic power distribution, i.e., the problem of output power cross adjustment, is encountered. The effect of this problem is that the output power of the main circuit will affect the output power of the auxiliary circuit at the same time. For example, when the output power of the main circuit is at a small load or no load (equivalent to that the high-voltage battery at the first DC output is about to be full or already full), a master controller will issue a small duty cycle and even enter into an intermittent operation mode, and in this case, the magnetic flux in a transformer is very small, or almost zero, the induced voltage on the winding of the auxiliary circuit will also be zero. If the auxiliary circuit requires a large output power (equivalent to using a vehicle-mounted electrical appliance in the vehicle), the situation that output power cannot meet use demands will happen.

Therefore, it is desired to design a control method that can stabilize the magnetic flux in the transformer when the main circuit output is at a light load and no load, so that the auxiliary circuit can normally draw electric energy from the transformer, and conversion direction of the power in each port and the number of conversions can also be controlled conveniently.

SUMMARY

The objective of the present invention is to solve the above problem in the prior art, and to provide a phase shift control method for a charging circuit.

In order to solve the above technical problem, the present invention provides a phase shift control method for a charging circuit. The charging circuit comprises a primary conversion circuit, a first secondary conversion circuit, a second secondary conversion circuit, and a transformer connecting the three circuits, wherein the primary conversion circuit has a first group of power switches and a second group of power switches, and the two groups of power switches have opposite switching actions; the first secondary conversion circuit has a third group of power switches and a fourth group of power switches, and the two groups of power switches have opposite switching actions; a first capacitor, a first inductor, and a primary winding in the transformer are connected in series between the first group of power switches and the second group of power switches; the charging circuit further comprises a first secondary current collector and a first secondary voltage collector for collecting parameters of the first secondary conversion circuit, as well as a controller connecting each collector and each power switch; the controller carries out PWM control on the first and the second groups of power switches in the primary conversion circuit and also carries out PWM control on the third and the fourth groups of power switches in the first secondary conversion circuit at the same time, and further causes a phase angle difference $\Phi$ between a switching waveform of the first group of power switches and an ON/OFF waveform of the third group of power switches; the controller collects an output current and an output voltage of the first secondary conversion circuit through the first secondary current collector and the first secondary voltage collector, carries out comparison and calculation between the collected output current and output voltage and a preset output current and output voltage, and adjusts the magnitude and positive and negative of the phase angle difference $\Phi$ according to the comparison result.

In an embodiment, the duty cycles of the first, the second, the third, and the fourth groups of power switches are all 50%.

The controller collects the output current and the output voltage of the first secondary conversion circuit through the first secondary current collector and the first secondary voltage collector, and compares the output current and the output voltage of the first secondary conversion circuit with preset values; when the output current and the output voltage of the first secondary conversion circuit are less than the preset values, the controller adjusts PWM control over the third and the fourth groups of power switches to increase the phase angle difference $\Phi$, so that the output current and the output voltage of the first secondary conversion circuit are close to or equal to the preset values; when the output current and the output voltage of the first secondary conversion circuit are greater than the preset values, the controller adjusts PWM control over the third and the fourth groups of power switches to reduce the phase angle difference $\Phi$, so that the output current and the output voltage of the first secondary conversion circuit are close to or equal to the preset values.

The controller has a charging mode and an inverter mode. In the charging mode, the electric energy flows from the primary conversion circuit to the first secondary conversion circuit; in the inverter mode, the electric energy flows from the first secondary conversion circuit to the primary conversion circuit.

The output current and the output voltage of the first secondary conversion circuit are collected, the output power of the first secondary conversion circuit is calculated, and the PWM periods of the first to fourth groups of power switches are adjusted according to the magnitude of the output power.

An comparison table between the equivalent impedance of the first secondary conversion circuit and the switching period is preset, a full-load output power Pout, a primary winding W1 and a secondary winding W2 are preset, and the input voltage of the primary conversion circuit is detected, the impedance Zo1 of the first secondary conversion circuit is calculated according to the formula, $$Zo1 = \frac{(Vo1)^2}{Pout}$$

the equivalent impedance Zin of the primary conversion circuit is calculated according to the formula, $$Zin = \left(\frac{W1}{W2}\right)^2 Zo1$$

the switching period is searched in the comparison table by the equivalent impedance of the first conversion circuit, and the controller controls the PWM periods of the first to the fourth groups of power switches according to the switching period.

The controller compares and compensates the collected output current and output voltage of the first secondary conversion circuit, and generates a phase angle difference Φ by using the obtained compensation values, and the sum of the PWM time of the first group of power switches and the phase angle difference Φ is the PWM time of the third group of power switches.

The comparison and compensation comprises: performing a difference operation between the output current of the first secondary conversion circuit and a first reference value, performing loop compensation on the difference between the output current and the first reference value, carrying out a minimum operation on the obtained compensated value and a preset voltage loop value to take its minimum value as the voltage loop reference value, performing a difference operation between the output voltage of the first secondary conversion circuit and the voltage loop reference value, and performing loop compensation on the difference between the output voltage and the voltage loop reference value, and generating a phase angle difference Φ by using the obtained compensation value.

Compared with the prior art, the present invention uses a DSP (Digital Signal Processor) to simultaneously control the output voltage at both ends, and also stabilizes the magnetic flux in the transformer when the main circuit output is at a light load and no load, thereby ensuring that the auxiliary circuit can draw electric energy from the transformer normally and supply power to the outside normally, and moreover conveniently controlling the conversion direction of the power in each port and the number of conversions.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein.

DETAILED DESCRIPTION

In order to make the objectives, technical solutions and advantages of the present invention more comprehensible, the present invention will be described in detail below in conjunction with drawings and embodiments. It should be understood that the specific embodiments described here are only for explaining the present invention rather than limiting it.

In the present invention, the output power of the main circuit is controlled by phase shifting. No matter how the output power of the main circuit changes, there is always a magnetic flux in the transformer. In this case, a winding of the auxiliary circuit always has an induced voltage converted according to the winding pair. Therefore, there is no problem if the auxiliary circuit requires a large output power, which solves the problem of automatic power distribution of a conventional transformer integrated power supply.

Figure 1:
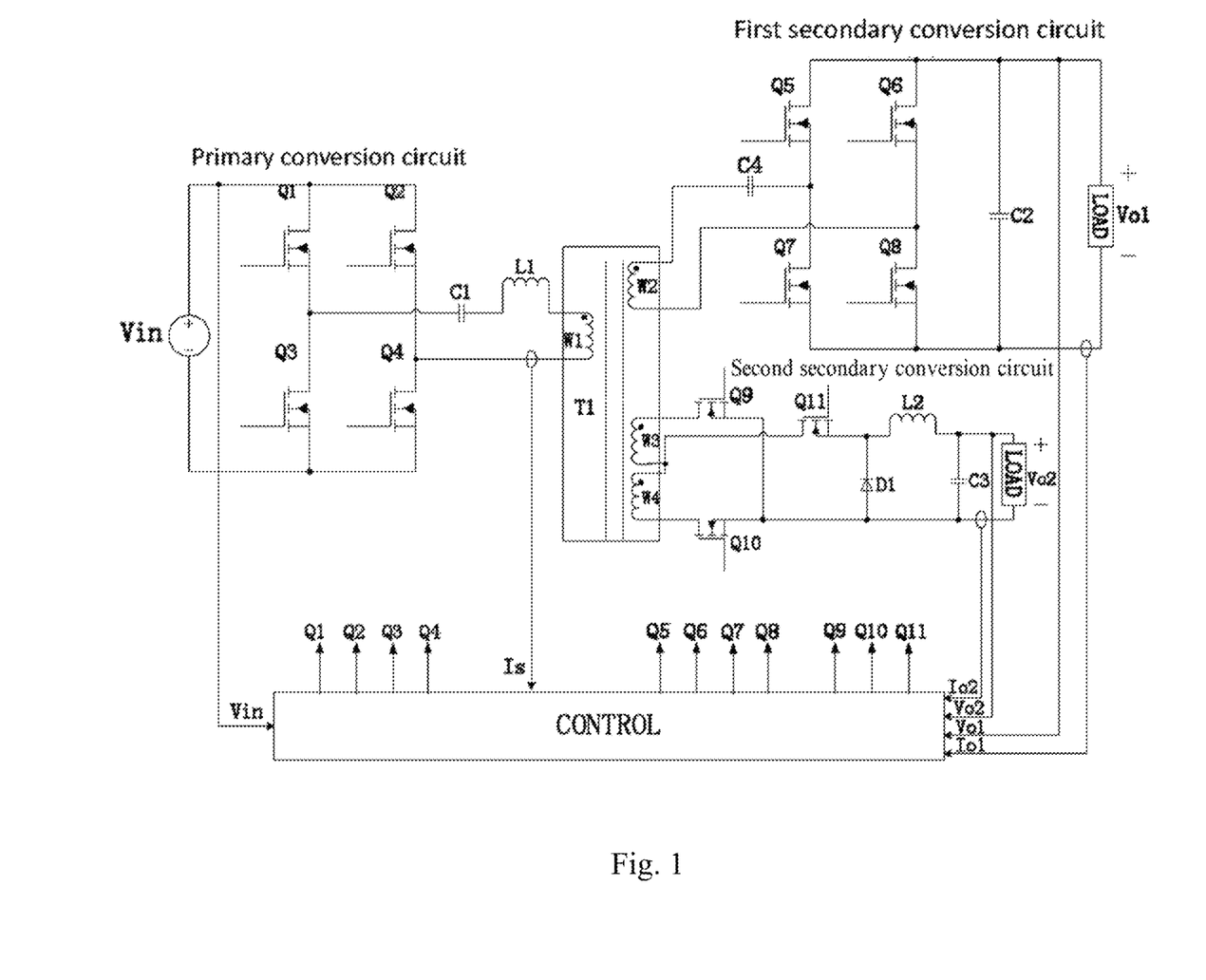
FIG. 1 is a topological structure diagram.

FIG. 1 is a topological structural diagram of a phase shift control method for a charging circuit according to the present invention. The charging circuit includes a primary conversion circuit, a first secondary conversion circuit, a second secondary conversion circuit, and a transformer T1 connecting the three circuits. The primary conversion circuit here has a first group of power switches Q1 and Q4 and a second group of power switches Q2 and Q3, and the two groups of power switches have opposite switching actions. The first secondary conversion circuit has a third group of power switches Q5 and Q8 and a fourth group of power switches Q6 and Q7, and the two groups of power switches have opposite switching actions. A first capacitor C1 and a first inductor L1, as well as a primary winding W1 in the transformer, are connected in series between the first and the second group of power switches in the primary conversion circuit. The charging circuit further includes a first secondary current collector (denoted as a small circle in the figure) for collecting an output current Io1 of the first secondary conversion circuit and a first voltage collector (denoted as a point in the figure) for collecting an output voltage Vo1 of the first secondary conversion circuit, as well as a controller connecting each collector and each power switch. The controller carries out PWM control on the first and the second groups of power switches in the primary conversion circuit and also carries out PWM control on the third and the fourth groups of power switches in the first secondary conversion circuit, and further causes a phase angle difference Φ between an ON/OFF waveform of the first group of power switches and an ON/OFF waveform of the third group of power switches. The controller receives the output current Io1 and the output voltage Vo1 of the first secondary conversion circuit, collected by the first secondary current collector and the first secondary voltage collector, carries out comparison and calculation between the collected output current and output voltage and a preset output current and output voltage, and adjusts the magnitude and positive and negative of the phase angle difference Φ according to the comparison result.

In a preferred embodiment, the duty cycles of the first, the second, the third, and the fourth groups of power switches are all 50%.

The controller collects the output current and the output voltage of the first secondary conversion circuit through the first secondary current collector and the first secondary voltage collector, and compares the output current and the output voltage of the first secondary conversion circuit with preset values; when the output current and the output voltage of the first secondary conversion circuit are less than the preset values, the controller adjusts PWM control over the third and the fourth groups of power switches to increase the phase angle difference Φ, so that the output current and the output voltage of the first secondary conversion circuit are close to or equal to the preset values; when the output current and the output voltage of the first secondary conversion circuit are greater than the preset values, the controller adjusts PWM control over the third and the fourth groups of power switches to reduce the phase angle difference Φ, so that the output current and the output voltage of the first secondary conversion circuit are close to or equal to the preset values.

Figure 2:
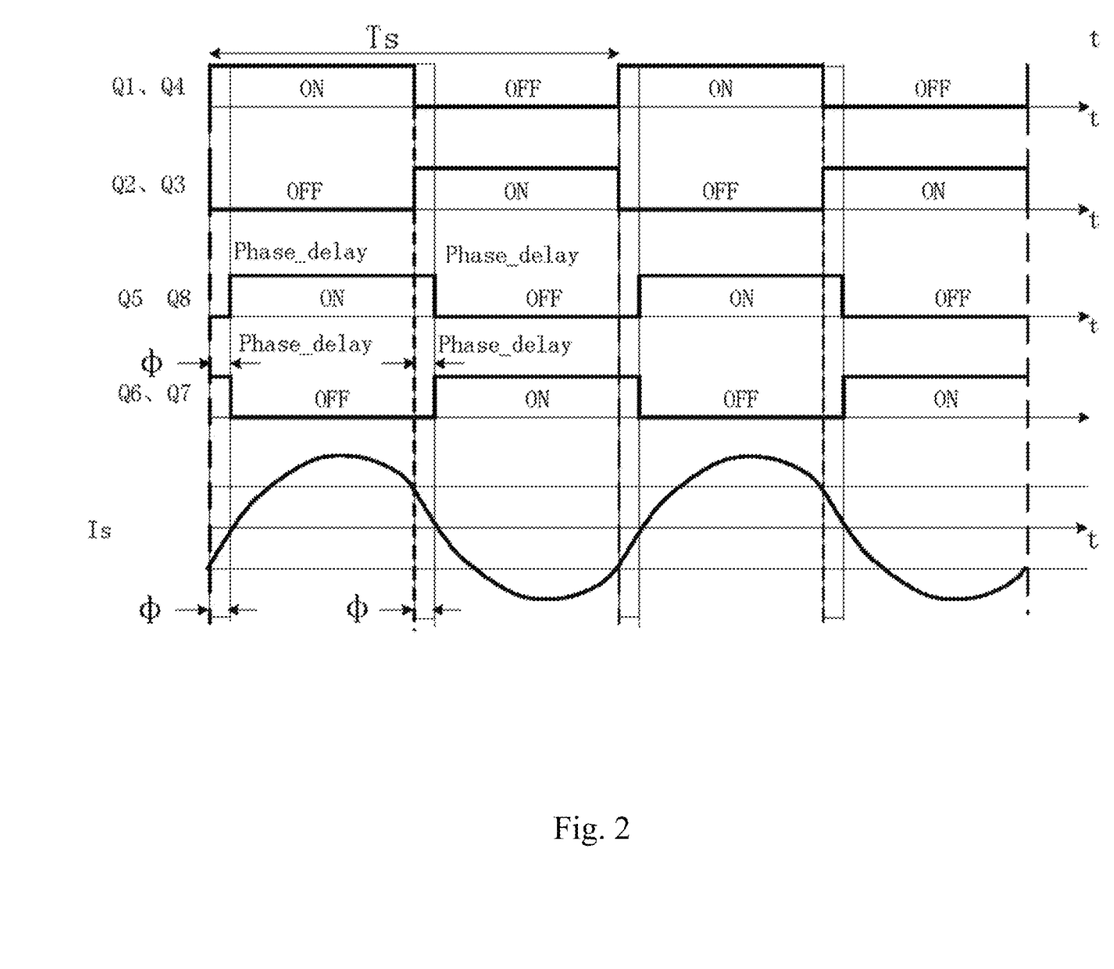
FIG. 2 is the logic timing of phase shift control.

Referring to FIG. 2, when the phase angle difference Φ between Q1, Q4 and Q5, Q8 is increased, ON waveforms (the waveforms of Q5 and Q8) of the third group of power switches are shifted to the right with respect to the ON waveforms (the waveforms of Q1 and Q4) of the first group of power switches; when the phase angle difference Φ is decreased, the ON waveforms of the third group of power switches are shifted to the left with respect to the ON waveforms of the first group of power switches. It should be noted that the so-called ON duty cycle of a switch is 50%, which actually includes dead time. The dead time is a protection period set, in the case of PWM output, for preventing upper and lower bridge arms from being simultaneously turned on due to the switching speed problem. The smaller the dead time, the better the output waveform, but it will reduce reliability, typically in a microsecond range. Since the present invention does not adjust the dead time, for the convenience of description, the ON duty ratios of the switches are collectively referred to as 50%, and the actual ON time is slightly less than 50%. ON in FIG. 2 refers to high level in the control waveform, and OFF refers to low level in the control waveform.

The controller has a charging mode and an inverter mode. In the charging mode, the electric energy flows from the primary conversion circuit to the first secondary conversion circuit; in the inverting mode, the electric energy flows from the first secondary conversion circuit to the primary conversion circuit.

Reference is made to the logic timing of phase shift control shown in FIG. 2. Q1-Q4 and Q5-Q8 all carry out PWM according to a duty cycle of 50%. The timings of Q1 and Q4 are the same, the timings of Q2 and Q3 are the same, and there is dead time between therebetween. The timings of Q5 and Q8 are the same, the timings of Q6 and Q7 are the same, and there is dead time between therebetween. The most core control is: there is a phase angle difference Φ between the PWM of Q1-Q4 and the PWM of Q5-Q8. By controlling the phase angle difference Φ between Q1-Q4 and Q5-Q8, the transmission direction and magnitude of the energy between the "primary conversion circuit" and the "first secondary conversion circuit" are controlled. When Q5-Q8 carry out PWM according to a duty cycle of 50%, considering that C4 belongs to the capacitance characteristic "isolating DC and switching on AC", the voltage at two ends of a winding W2 of the transformer T1 is controlled so that the output voltage of the "secondary first conversion circuit" is positively and negatively inverted; in this case, the voltages of a winding W3 and a winding W4 of the transformer T1 are mapped to corresponding voltage values according to the winding W2/W3 or the winding W2/W4 of the transformer, and the "second secondary conversion circuit" then may form a Buck step-down circuit by controlling Q11 and D1, and the output power is fully controllable.

Figure 3:
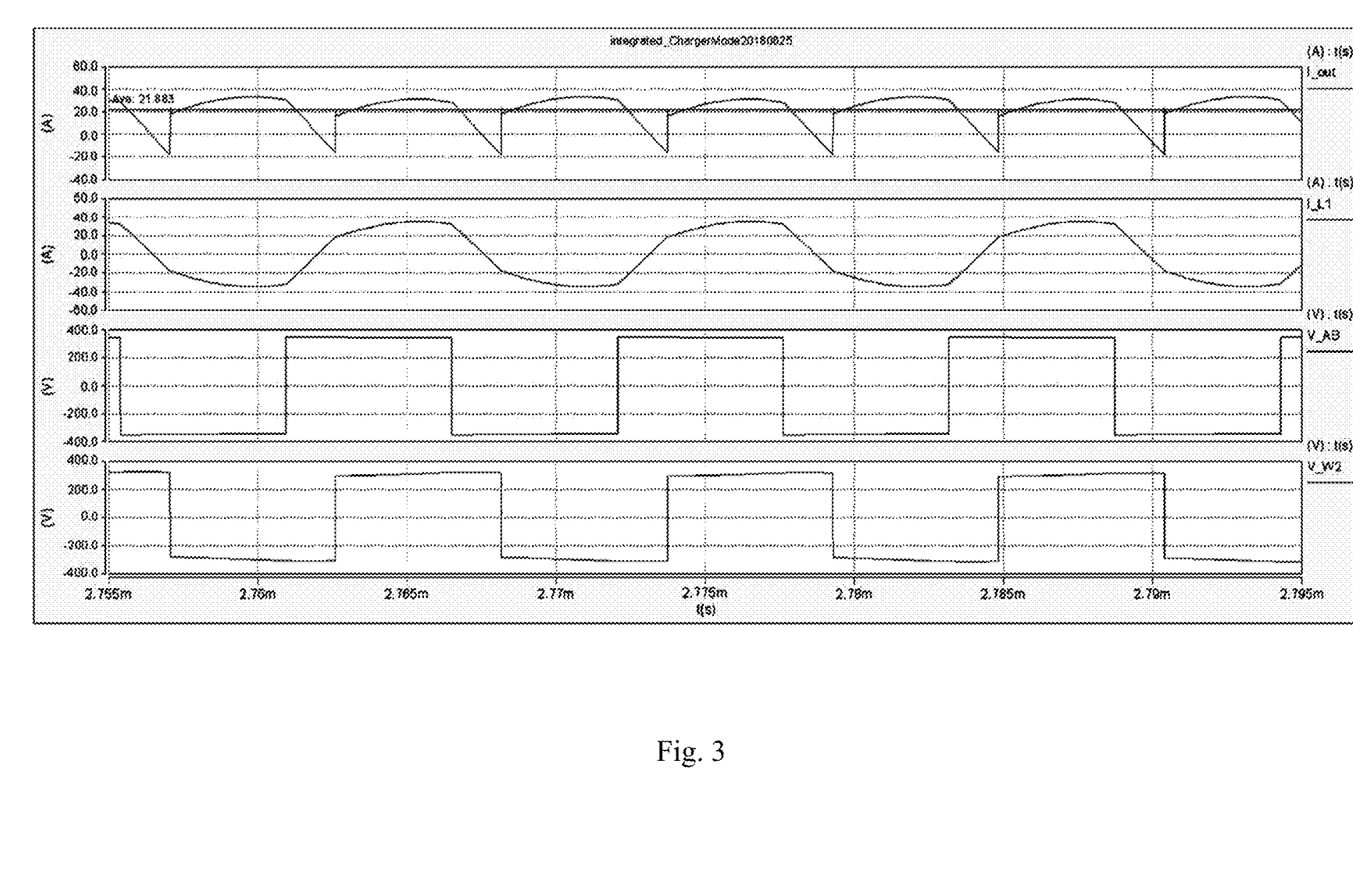
FIG. 3 is a simulation waveform diagram with a delayed phase angle difference Φ.

Reference could be made to the simulation waveform diagram with a delay phase angle difference Φ shown in FIG. 3. The phase angle of Q5-Q8 is delayed behind the phase angle of Q1-Q4, and the delayed angle is set to 30% in the simulation. Tout refers to the output current of the first secondary conversion circuit. It can be seen that the output current is 21.8 A at this time; I_L1 is the current in the inductor L1; V_AB is the voltage at two points of AB in FIG. 1; V_W2 is the voltage at two ends of W2 in FIG. 1. Since the phase angle of Q5-Q8 is delayed behind Q1-Q4, the energy is transferred from the "primary conversion circuit" to the "first secondary conversion circuit".

Figure 4:
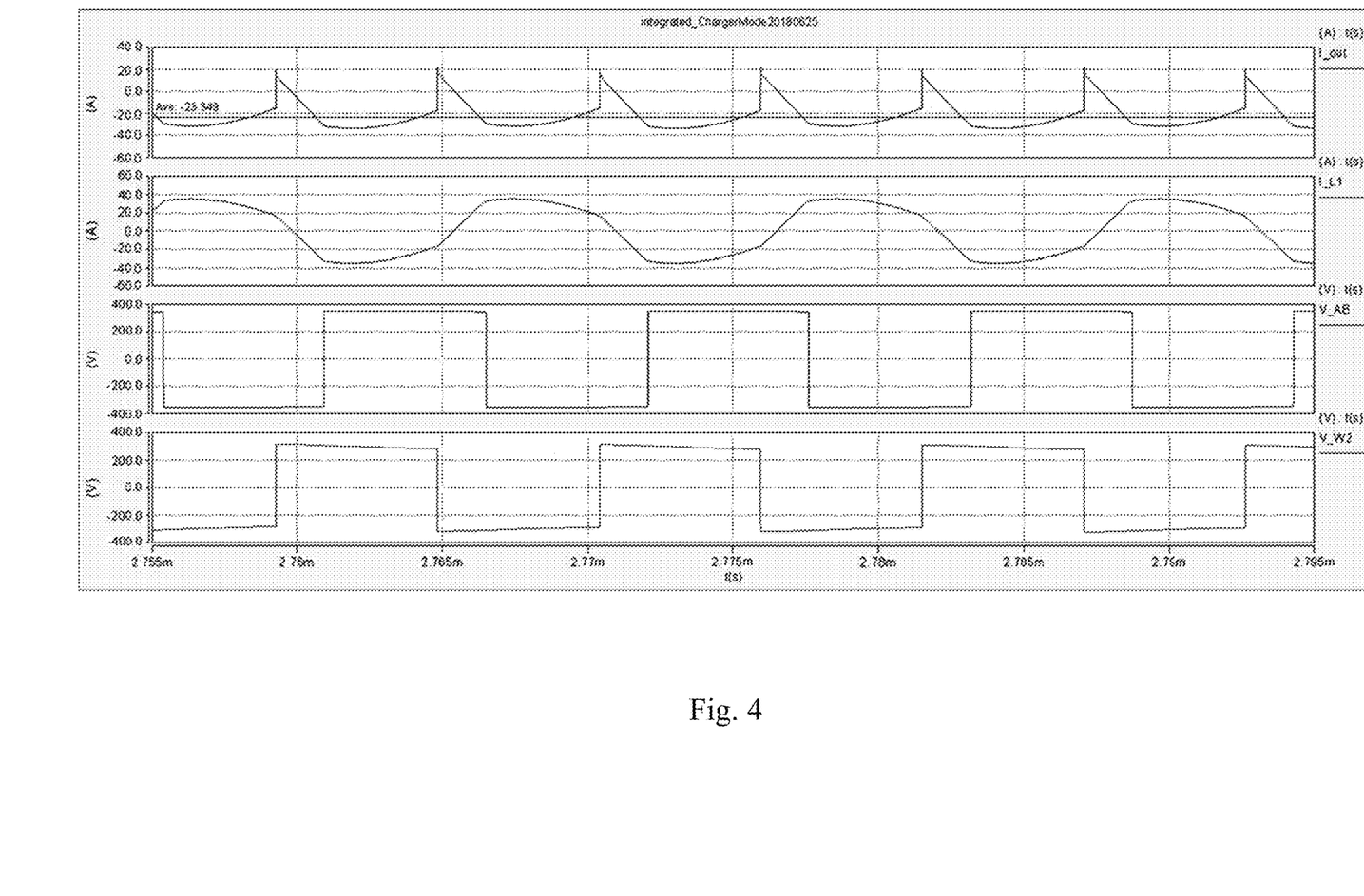
FIG. 4 is a simulation waveform diagram with a leading phase angle difference Φ.

Reference could be made to the simulation waveform diagram with a leading phase angle difference Φ shown in FIG. 4. The phase angle of Q5-Q8 takes the lead of the phase angle of Q1-Q4, and the leading angle is set to 30% in the simulation. Tout refers to the output current of the first secondary conversion circuit. It can be seen that the output current is −23.3 A at this time; I_L1 is the current in the inductor L1; V_AB is the voltage at two points of AB in FIG. 1; V_W2 is the voltage at two ends of W2 in FIG. 1. Since the phase angle of Q5-Q8 takes the lead of the phase angle of Q1-Q4, the energy is transferred from the "first secondary conversion circuit" to the "primary conversion circuit".

Figure 5:
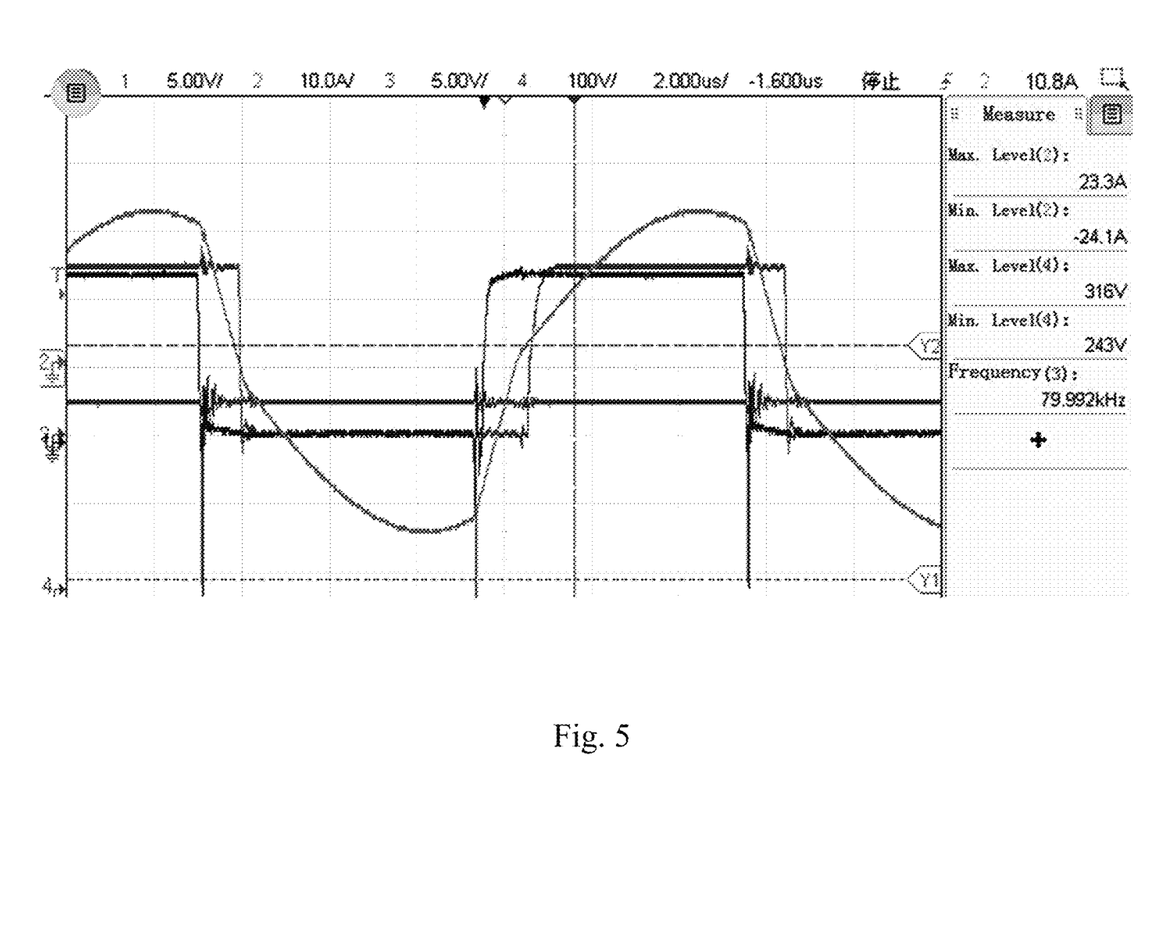
FIG. 5 is a measured waveform diagram of the phase shift control.

FIG. 5 is a measured waveform diagram of the phase shift control, which is basically consistent with the simulation waveform. It can be seen that in the control mode of the leading phase angle and the delayed phase angle, since the first secondary conversion circuit always carries out PWM symmetrically according to 50%, the excitation in the transformer T1 always exists, so the voltages of the winding W2 and the winding W3/W4 are always mapped according to a turn ratio. It may be maintained whenever the second secondary conversion circuit requires power.

Figure 6:
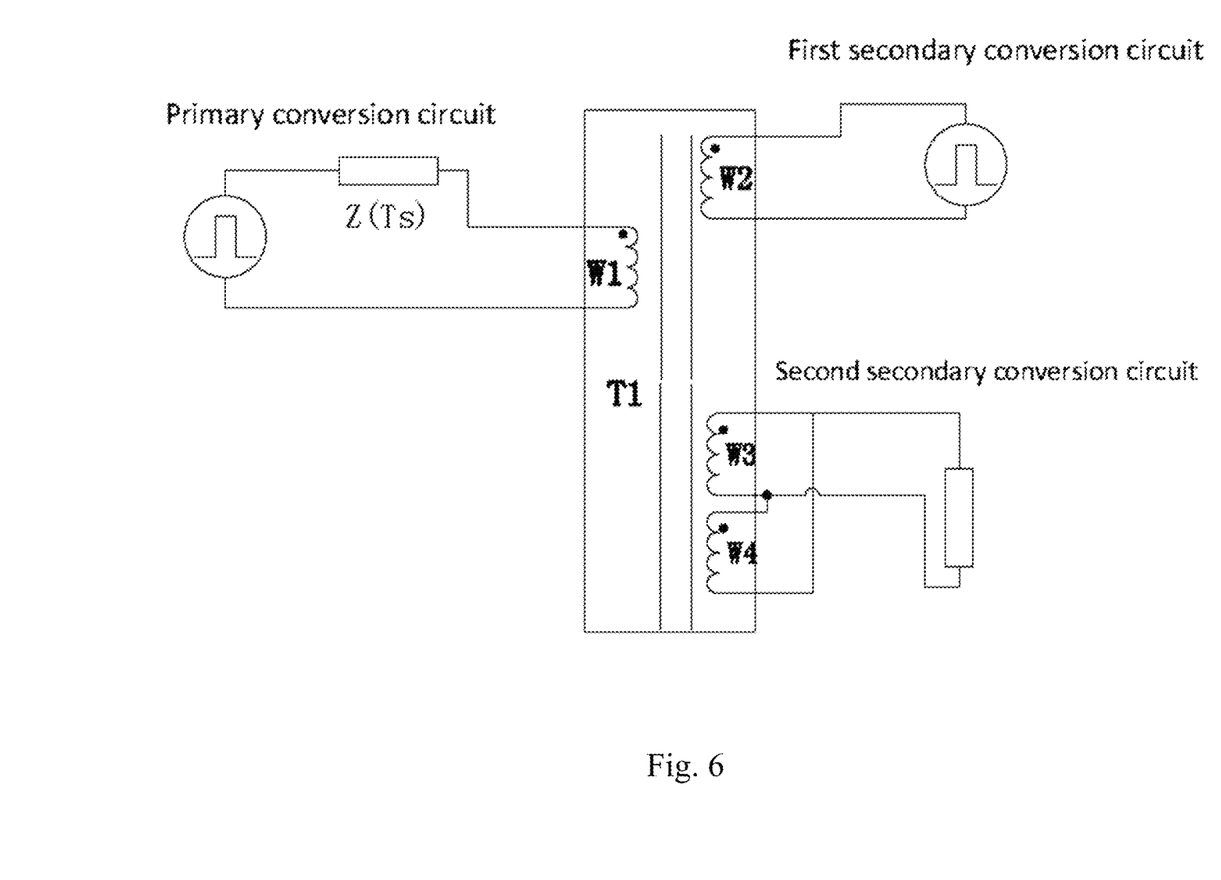
FIG. 6 is a diagram of a primary and secondary impedance model.

While controlling the phase angle difference Φ, the switching period Ts of the primary conversion circuit and the first secondary conversion circuit is also controlled. Its significance is that since the inductor L1 and the capacitor C1 exist in the primary conversion circuit, the two form a network of which the equivalent reactance may change with the switching period. Its mathematical expression is:

$$Z(Ts) = \left| 2 \cdot \pi \cdot \frac{1}{Ts} \cdot L1 + \frac{1}{2 \cdot \pi \cdot \frac{1}{Ts} \cdot C1} \right|$$

in the formula, the equivalent reactance Z (Ts) changes with Ts, L1 and C1. In practical applications, in order to improve efficiency and avoid excessive reactive energy, Z (Ts) is changed by controlling Ts, and the optimal matching characteristics are obtained. We can simplify FIG. 1 into a diagram of a primary and secondary impedance model as shown in FIG. 6.

Figure 7:
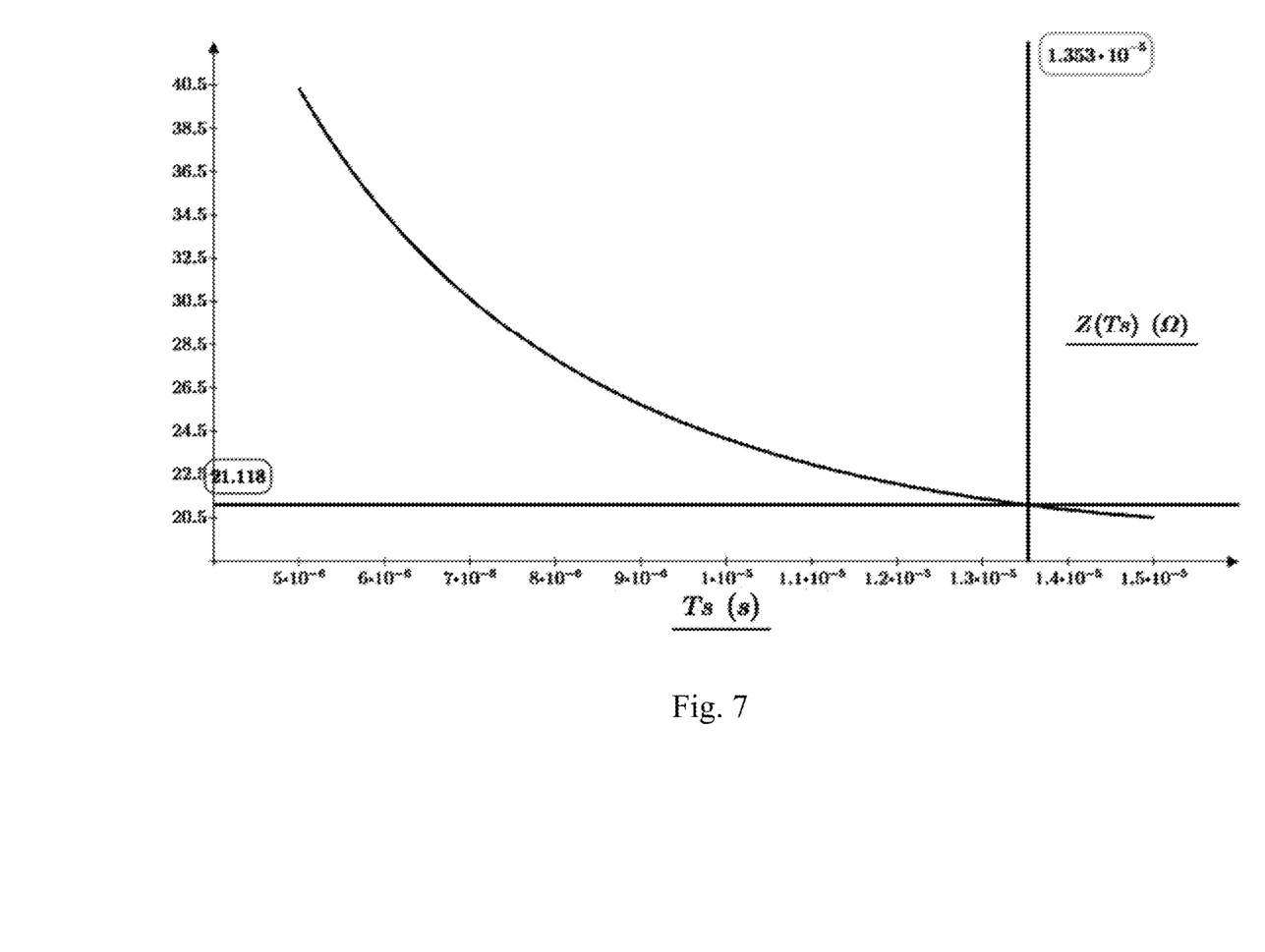
FIG. 7 is a comparison diagram of the equivalent impedance Zin of the primary conversion circuit and the switching period Ts.

In a specific embodiment, if L1 is 30 uH and C1 is 300 nF, the reactance curve of Z(Ts) is shown in FIG. 7. The abscissa refers to the period and the ordinate refers to the impedance. According to the magnitude of the output load, the impedance is found, and the appropriate Ts is then selected, so as to obtain the better Z (Ts); if the output power is at a full load, i.e., 6.6 Kw, the output voltage is 400V, the primary winding W1 has 14 turns, the first secondary winding W2 has 15 turns, the equivalent impedance of the first secondary winding W2 is:

$$\frac{(400\ V)^2}{6600\ W} = 24.242\ \Omega$$

its impedance mapped to the primary winding W1 is:

$$\left(\frac{14}{15}\right)^2 \cdot \frac{(400\ V)^2}{6600\ W} = 21.118\ \Omega$$

According to the idea of designing reactance matching, Z (Ts) is controlled to be basically consistent with the impedance mapping value. As shown in FIG. 7, Ts is 13.53 us, and the corresponding switching frequency is 74 kHz.

In a preferred embodiment, the output current Io1 and the output voltage Vo1 of the first secondary conversion circuit are collected, the output power of the first secondary conversion circuit is calculated, and the PWM periods of the first to fourth groups of power switches are adjusted according to the magnitude of the output power.

In a preferred embodiment, a comparison table of the equivalent impedance Zin of the primary conversion circuit and the switching period Ts is preset, and the full-load output power Pout is preset, and the comparison table is a table form of the comparison diagram shown in FIG. 7.

The primary winding W1 and the first secondary winding W2 are used to detect the output voltage Vo1 of the first secondary conversion circuit, and the impedance Zo1 of the first secondary conversion circuit is calculated according to formula (1), $$Zin = \left(\frac{W1}{W2}\right)^2 Zo1 \quad (1)$$

the equivalent impedance Zin of the primary conversion circuit is calculated according to the formula (2), $$Zo1 = \frac{(Vo1)^2}{Pout} \quad (2)$$

the switching period Ts corresponding to the switches is searched in the comparison table by the equivalent impedance Zin of the primary conversion circuit, and the controller controls the PWM periods of the first to the fourth groups of power switches according to the switching period Ts.

Figure 8:
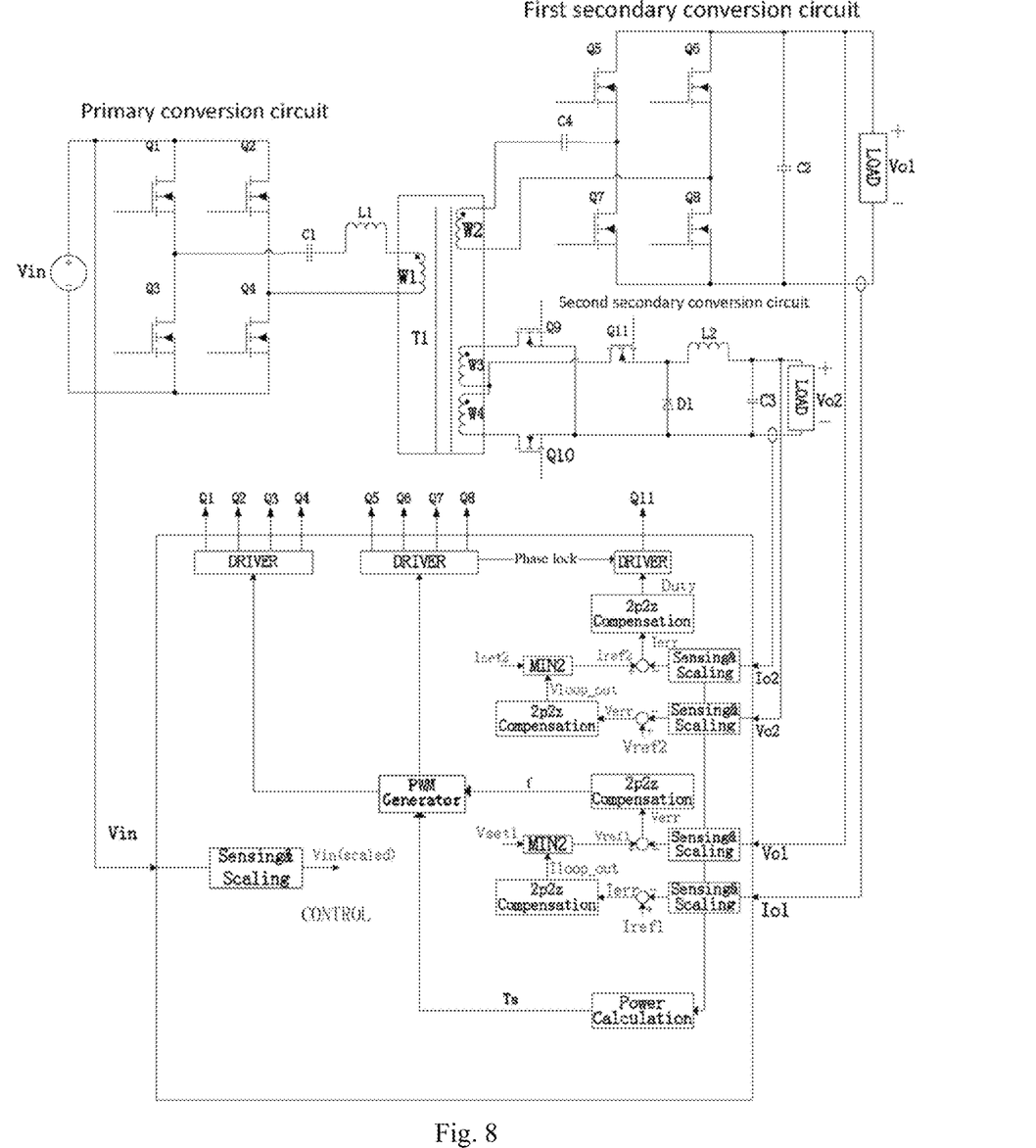
FIG. 8 is a block diagram of the control principle.

FIG. 8 shows a block diagram of the control principle according to a preferred embodiment. The controller compares and compensates the collected output current Io1 and output voltage Vo1 of the first secondary conversion circuit, and generates a phase angle difference Φ by using the obtained compensation values, and the sum of the PWM time of the first group of power switches Q1 and Q4 and the phase angle difference Φ is the PWM time of the third group of power switches Q5 and Q8. Referring to the phase shift control logic timing shown in FIG. 2, the ON and OFF actions of the first and the second groups of power switches are opposite, and the ON and OFF actions of the third and the fourth groups of power switches are opposite.

The comparison and compensation comprises: performing a difference operation between the output current Io1 of the first secondary conversion circuit and a first reference value Iref1, performing loop compensation on the difference between the output current and the first reference value, carrying out a minimum operation on the obtained compensated value and a preset voltage loop value Vset1 to take its minimum value as the voltage loop reference value Vref1, performing a difference operation between the output voltage Vo1 of the first secondary conversion circuit and the voltage loop reference value, and performing loop compensation on the difference between the output voltage and the voltage loop reference value, and generating a phase angle difference Φ by using the obtained compensation value.

The above embodiments are merely illustrative and should not be construed as limiting the present invention. Any equivalent modifications or variations of the present invention, made without departing from the spirit and coverage of the present application are intended to be included within the scope of the appended claims.

What is claimed is:

1. A phase shift control method for a charging circuit, wherein the charging circuit comprises a primary conversion circuit, a first secondary conversion circuit, a second secondary conversion circuit, and a transformer T1 connecting the three circuits, wherein the primary conversion circuit has a first group of power switches Q1 and Q4 and a second group of power switches Q2 and Q3, and the two groups of power switches have opposite switching actions; the first secondary conversion circuit has a third group of power switches Q5 and Q8 and a fourth group of power switches Q6 and Q7, and the two groups of power switches have opposite switching actions; a first capacitor C1, a first inductor L1, and a primary winding W1 of the transformer, are connected in series between the first group of power switches and the second group of power switches; and wherein the charging circuit further comprises a first secondary current collector and a first secondary voltage collector for collecting parameters of the first secondary conversion circuit, as well as a controller connecting all the collectors and all the power switches;

the controller carries out PWM control on the first and the second groups of power switches in the primary conversion circuit and also carries out PWM control on the third and the fourth groups of power switches in the first secondary conversion circuit at the same time, and further causes a phase angle difference Φ between an ON/OFF waveform of the first group of power switches and an ON/OFF waveform of the third group of power switches;

the controller receives an output current (Io1) and an output voltage (Vo1) of the first secondary conversion circuit, collected by the first secondary current collector and the first secondary voltage collector, carries out comparison and calculation between the collected output current Io1 and output voltage Vo1 and a preset output current and output voltage, and adjusts the magnitude and positive and negative of the phase angle difference Φ according to the comparison result.

2. The phase shift control method for a charging circuit of claim 1, wherein
the duty cycles of the first, the second, the third, and the fourth groups of power switches are all 50%.

3. The phase shift control method for a charging circuit of claim 1, wherein
when the output current and the output voltage of the first secondary conversion circuit are less than the preset values, the controller adjusts PWM control over the third and the fourth groups of power switches to increase the phase angle difference Φ, so that the output current and the output voltage of the first secondary conversion circuit are close to or equal to the preset values; and when the output current and the output voltage of the first secondary conversion circuit are greater than the preset values, the controller adjusts PWM control over the third and the fourth groups of power switches to reduce the phase angle difference Φ, so that the output current and the output voltage of the first secondary conversion circuit are close to or equal to the preset values.

4. The phase shift control method for a charging circuit of claim 1, wherein
the controller has a charging mode and an inverter mode; in the charging mode, the electric energy flows from the primary conversion circuit to the first secondary conversion circuit; in the inverter mode, the electric energy flows from the first secondary conversion circuit to the primary conversion circuit.

5. The phase shift control method for a charging circuit of claim 1, wherein the output current and the output voltage of the first secondary conversion circuit are collected, the output power of the first secondary conversion circuit is calculated, and the PWM periods of the first to fourth groups of power switches are adjusted according to the magnitude of the output power.

6. The phase shift control method for a charging circuit of claim 1, wherein a comparison table between an equivalent impedance Zin of the first secondary conversion circuit and the switching period is preset, a full-load output power Pout, a primary winding W1 and a secondary winding W2 are preset, and the impedance Zo1 of the first secondary conversion circuit is calculated according to a formula (1), $$Zo1 = \frac{(Vo1)^2}{Pout} \quad (1)$$

the equivalent impedance Zin of the primary conversion circuit is calculated according to a formula (2), $$Zin = \left(\frac{W1}{W2}\right)^2 Zo1 \quad (2)$$

the switching period Ts corresponding to the switches is searched in the comparison table by the equivalent impedance Zin of the primary conversion circuit, and the controller controls the PWM periods of the first to the fourth groups of power switches according to the switching period.

7. The phase shift control method for a charging circuit of claim 1, wherein the controller compares and compensates the collected output current Io1 and output voltage Vo1 of the first secondary conversion circuit, and generates a phase angle difference Φ by using the obtained compensation values, and the sum of the PWM time of the first group of power switches (Q1 and Q4) and the phase angle difference Φ is the PWM time of the third group of power switches (Q5 and Q8).

8. The phase shift control method for a charging circuit of claim 7, wherein the comparison and compensation comprises: performing a difference operation between the output current Io1 of the first secondary conversion circuit and a first reference value Iref1, performing loop compensation on the difference between the output current and the first reference value, carrying out a minimum operation on the obtained compensated value and a preset voltage loop value Vset1 to take its minimum value as the voltage loop reference value Vref1, performing a difference operation between the output voltage Vo1 of the first secondary conversion circuit and the voltage loop reference value, and performing loop compensation on the difference between the output voltage and the voltage loop reference value, and generating a phase angle difference Φ by using the obtained compensation value.

* * * * *